United States Patent [19]
Coppersmith et al.

[11] Patent Number: 6,101,275
[45] Date of Patent: Aug. 8, 2000

[54] METHOD FOR FINDING A BEST TEST FOR A NOMINAL ATTRIBUTE FOR GENERATING A BINARY DECISION TREE

[75] Inventors: Don Coppersmith, Ossining; Se June Hong, Yorktown Heights; Jonathan R. M. Hosking, Scarsdale, all of N.Y.

[73] Assignee: International Business Machines Corporation, Armonk, N.Y.

[21] Appl. No.: 09/013,147

[22] Filed: Jan. 26, 1998

[51] Int. Cl.⁷ .............................. G06K 9/36; G06K 9/46; G06K 9/68
[52] U.S. Cl. ........................... 382/226; 382/227; 382/240
[58] Field of Search ..................... 382/133, 224, 382/226, 199, 227; 704/240; 706/45, 46, 47

[56] References Cited

U.S. PATENT DOCUMENTS

| | | | |
|---|---|---|---|
| 4,944,023 | 7/1990 | Imao et al. | 382/226 |
| 5,077,809 | 12/1991 | Ghazizadeh | 382/226 |
| 5,170,440 | 12/1992 | Cox | 382/199 |
| 5,218,646 | 6/1993 | Sirat et al. | 382/226 |
| 5,263,124 | 11/1993 | Weaver et al. | 382/226 |
| 5,463,773 | 10/1995 | Sakakibara et al. | 382/226 |
| 5,553,163 | 9/1996 | Nivelle | 382/227 |
| 5,661,820 | 8/1997 | Kegelmeyer, Jr. | 382/226 |
| 5,787,194 | 7/1998 | Yair | 382/226 |
| 5,818,965 | 10/1998 | Davies | 382/226 |

OTHER PUBLICATIONS

Yoshikawa, et al "A Fully Automated Design of Binary Decision Tree for Land Cover Classification", IEEE, pp. 1921–1923, Feb. 1995.

Aborhey "Binary Decision Tree Test Functions", IEEE, pp. 1461–1465, 1988.

*Primary Examiner*—Phuoc Tran
*Assistant Examiner*—Daniel G. Mariam
*Attorney, Agent, or Firm*—McGinn & Gibb, P.C.; Stephen C. Kaufman, Esq.

[57] ABSTRACT

A fast way for determining the best subset test for a nominal attribute in a decision tree. When a nominal attribute has n distinct values, the prior art requires computing the impurity functions on each of the $2^{n-1}-1$ possible subset partitioning of the n values and finding the minimum case among them. This invention guarantees the minimum impurity test on the attribute by computing only (n−1) impurity function computations. This reduction of computational complexity makes it practically possible to find the true best tests for many real data mining application, where a binary decision tree is used as the classification model.

17 Claims, 2 Drawing Sheets

TABLE 1: Original contingency matrix

| i | vi | color | class PS | NP | PR |
|---|----|-------|----|----|----|
| 1 | v1 | green(G) | 20 | 3 | 1 |
| 2 | v2 | blue(B) | 19 | 4 | 2 |
| 3 | v3 | purple(P) | 25 | 4 | 7 |
| 4 | v4 | "orange"(O) | 80 | 5 | 25 |
| 5 | v5 | yellow(Y) | 100 | 2 | 3 |
| 6 | v6 | red(R) | 200 | 3 | 4 |
|   |    | total | 444 | 21 | 42 |

/10

****** footnote (number of examples is 507)

|  | Class | | |
|---|---|---|---|
| dark-orange: | 64 | 4 | 20 |
| light-orange: | 16 | 1 | 5 |
|  |  |  |  |
| Hence combined as "orange": | 80 | 5 | 25 |

************************************************ footnote: Here the color Orange may represent "dark-orange or light-orange" each of which may have been in the data, but the two values were combined because they had the same class probability profile.

Fig. 1

Table 2:

| | Color value partition POBGYR | Avg. class gini-index | Avg. class entropy | needed by new method | "swap variant" of new method |
|---|---|---|---|---|---|
| 1 | 1 0 0 0 0 0 | 0.2207 | 0.6426 | yes | yes |
| 2 | 1 0 0 0 0 1 | 0.2207 | 0.6392 | no | no |
| 3 | 1 0 0 0 1 0 | 0.2244 | 0.6551 | no | no |
| 4 | 1 0 0 0 1 1 | 0.2126 | 0.6096 | no | no |
| 5 | 1 0 0 1 0 0 | 0.2213 | 0.6417 | no | no |
| 6 | 1 0 0 1 0 1 | 0.2209 | 0.6394 | no | no |
| 7 | 1 0 0 1 1 0 | 0.2243 | 0.6531 | no | no |
| 8 | 1 0 0 1 1 1 | 0.2119 | 0.6087 | no | no |
| 9 | 1 0 1 0 0 0 | 0.2196 | 0.6353 | no | yes |
| 10 | 1 0 1 0 0 1 | 0.2218 | 0.6428 | no | no |
| 11 | 1 0 1 0 1 0 | 0.2242 | 0.6522 | no | no |
| 12 | 1 0 1 0 1 1 | 0.2139 | 0.6155 | no | no |
| 13 | 1 0 1 1 0 0 | 0.2197 | 0.6313 | no | no |
| 14 | 1 0 1 1 0 1 | 0.2217 | 0.6394 | no | no |
| 15 | 1 0 1 1 1 0 | 0.2238 | 0.6471 | no | no |
| 16 | 1 0 1 1 1 1 | 0.2126 | 0.6104 | no | yes |
| 17 | 1 1 0 0 0 0 | 0.2069 | 0.587 | yes | yes |
| 18 | 1 1 0 0 0 1 | 0.2232 | 0.6448 | no | no |
| 19 | 1 1 0 0 1 0 | 0.2179 | 0.6229 | no | no |
| 20 | 1 1 0 0 1 1 | 0.2227 | 0.642 | no | no |
| 21 | 1 1 0 1 0 0 | 0.2079 | 0.5892 | no | yes |
| 22 | 1 1 0 1 0 1 | 0.2233 | 0.6481 | no | no |
| 23 | 1 1 0 1 1 0 | 0.2177 | 0.6235 | no | no |
| 24 | 1 1 0 1 1 1 | 0.2231 | 0.6474 | no | no |
| 25 | 1 1 1 0 0 0 | 0.2055* | 0.5796 | yes | yes --minimum Gini |
| 26 | 1 1 1 0 0 1 | 0.2226 | 0.645 | no | no |
| 27 | 1 1 1 0 1 0 | 0.2163 | 0.6163 | no | yes |
| 28 | 1 1 1 0 1 1 | 0.224 | 0.6506 | no | no |
| 29 | 1 1 1 1 0 0 | 0.2059 | 0.5771* | yes | yes --minimum entropy |
| 30 | 1 1 1 1 0 1 | 0.2221 | 0.6432 | no | yes |
| 31 | 1 1 1 1 1 0 | 0.2156 | 0.6116 | yes | yes |

METHOD FOR FINDING A BEST TEST FOR A NOMINAL ATTRIBUTE FOR GENERATING A BINARY DECISION TREE

FIELD OF THE INVENTION

This invention relates to a "best" test methodology for a nominal attribute for generating a binary decision tree.

BACKGROUND OF THE INVENTION

Our work considers a fast method for finding a "best" test for a nominal attribute for generating a binary decision tree. In this regard, we note that when a nominal attribute has n distinct values, the prior art requires computing impurity functions on each of $(2^{n-1}-1)$ possible partitions of the n values into two subsets, in general, and finding the optimum case among them. Especially from a vantage point of the present invention, as described below, it may be discerned that this prior art approach can introduce computational complexities which may make it impractical for finding best or near best tests for many real data mining applications in which a binary decision tree is used as a classification model.

SUMMARY OF THE INVENTION

As indicated above, we have discerned that the referenced prior art computation may lead to impractical complexities, thus obviating advances in this area. In sharp contrast, we have now discovered a fast way for determining a best or very near best subset test for a nominal attribute in a decision tree. Whereas, the prior art, as indicated above, requires computing impurity functions on each of the $(2^{n-1}-1)$ possible partitions of the n values into two subsets, in general, and finding a minimum case among them, the present invention allows finding a minimal impurity test on the attribute by computing only (n-1) impurity function computations. This reduction of computational complexity, in turn, can advantageously make it practically possible to find a true best or very near best test for many real data mining applications in which a binary decision tree is used as a classification model.

In accordance with our discovery, we disclose a program storage device readable by a machine, tangibly embodying a program of instructions executable by the machine to perform method steps for finding a best test for a nominal attribute for generating a binary decision tree, the method comprising the steps of:

(1) reducing a number of values, n, to consider when there are identical class probabilities among the values of the nominal attribute;

(2) ordering the values of the nominal attribute by the ascending or descending value of the first principal component score computed from a weighted variance matrix; and (3) evaluating only consecutively larger subsets of values in the said order for impurity computations.

BRIEF DESCRIPTION OF THE DRAWING

The invention is illustrated in the accompanying drawing, in which:

FIG. 1 provides a Table I comprising an original contingency matrix; and

DETAILED DESCRIPTION OF THE INVENTION

Figure 2:
FIG. 2 provides a Table II comprising partitions and computed average impurity values.

As summarized above, we provide a fast way to determine the best subset test for a nominal attribute in a decision tree. When a nominal attribute has n distinct values, the prior art requires computing the impurity functions on each of the $(2^{n-1}-1)$ possible partitions of the n values into two subsets, in general, and finding the minimum case among them. This invention, in sharp contrast, allows finding a minimal impurity test on the attribute by computing only (n-1) impurity function computations for the basic procedure, or (2n-2) such computations for a variant of the procedure. This reduction of computational complexity makes it practically possible to find the true best tests for many real data mining applications in which a binary decision tree is used as the classification model.

When a binary decision tree is generated from data one needs to test at a given decision node whether an attribute is less than a certain value, if the attribute is numerical, or if the attribute value is an element of certain subset of the possible values of the attribute, if the attribute is nominal. In the case of a nominal attribute (e.g. "color" attribute can take on values of red, white, blue, etc.), the best test is usually defined as that subset-test (e.g. "is it red or blue?") that minimizes the class impurity of the resulting partition of the data by the test outcome. This invention preferably pertains to the generation of the best binary split test for multi-class problems.

The data is usually given as a table in which the rows are the training examples and the columns are the attributes. One of the columns (conventionally, the last column of the data table) is the target (class) attribute. A classification task is then to develop a decision model for the values of the target class value in terms of the other attributes. The rows are called records and the columns are called fields in database terminology. One popular model for classification is the binary decision tree with tests at the decision nodes such that the tree branches out by the test outcome of the node as yes-branch and no-branch. In such a decision tree the class of a new example is decided by following the tree branches from the root node by the test outcome at each node until a leaf node is reached, at which every example is assigned to a single class.

To generate a binary decision tree model from the given data comprising the training examples, one selects a test on one of the attributes such that the weighted average class impurity of the two groups of examples formed as a result of the test is minimized. Those examples that pass the test form a group in the yes-branch and those that fail form the remainder group in the no-branch. The test thus partitions the training examples into two groups. The entire set of training examples is thus partitioned by the root node test. When the examples in such a partitioned group are predominantly of one class, that branch ends at a leaf node labeled the predominant class. If the group of examples is still sufficiently impure, one selects another test in the same manner as before to further partition the examples in the group, recursively.

The class impurity of a group of N examples is usually defined in one of two ways: gini-index (used by CART (L. Breiman et al, Classification and Regression Trees, Wadsworth, 1984) and related decision tree induction techniques) and entropy (used by C4.5 (J. Quinlan, C4.5: Programs for Machine Learning, Morgan Kaufman, 1993) variety). Let the number of examples in K classes, $1, 2, \ldots, k, \ldots, K$, ($K \geq 2$), be $N_1, N_2, \ldots, N_k$, which sum to N. The class probability, then, is $P_k = N_k/N$ for all k. The Gini-index is defined as $$G(P_1, \ldots, P_k) = 1 - \sum_{k=1}^{k} P_k^2$$

If a test t partitions the examples into two groups of $N_A$ and $N_B$ examples each, $N_A+N_B=N$, and the $N_A$ group has $N_{Ak}$ class k examples, and the $N_B$ group likewise has $N_{Bk}$ class k examples, we have $N_{Ak}+N_{Bk}=N_k$ for all k, $N_{Ak}$'s sum to $N_A$, and $N_{Bk}$'s sum to $N_B$.

Let the corresponding probabilities be $P_{Ak}=N_{Ak}/N_A$ and $P_{Bk}=N_{Bk}/N_B$ for all k. The weighted class impurity of the two resulting partition groups in gini-index is given by:

$$G_{avg}(t)=(N_A/N) \times G(P_{A1}, \ldots, P_{Ak})+(N_B/N) \times G(P_{B1}, \ldots, P_{Bk}) \quad (1)$$

The entropy class impurity of a group of examples is defined using logarithm (usually base 2):

$$H(P_1, \ldots, P_k) = -\sum_{k+1}^{k} P_k \times \log P_k$$

And the weighted class impurity of the resulting partition of the test t in entropy is:

$$H_{avg}(t)=(N_A/N) \times H(P_{A1}, \ldots P_{AK})+(N_B/N) \times H(P_{B1}, \ldots, P_{BK}) \quad (2)$$

Let the n values of a nominal attribute be $V_1, V_2, \ldots, V_i, \ldots, V_n$, and let $m_i$ be the number of examples that have the attribute value $v_i$.

Let $f_{ik}$ denote the number of class k examples that have the attribute value $v_i$. We have $$N_k = \sum_{i=1}^{n} f_{ik} \text{ and } m_i = \sum_{k=1}^{K} f_{ik}$$

In statistics, the n by K matrix of elements, $F=[f_{ik}]$, is called the contingency matrix. It is readily counted from the examples data. We further define class probabilities for each value of the attribute as $P_{ik}=f_{ik}/m_i$. The probability matrix corresponding to F is $P=[P_{ik}]$. A subset test t(s) of a given subset s of the index set $\{1,2, \ldots, n\}$ is the evaluation of the impurity of the binary partition of the index set into the set s and its complement. For the subset test t(s). We have.

$$N_{AK}(s) = \sum_{i \in s} f_{ik}$$

$$N_{Bk}(s) = N_k - N_{Ak}$$

To find the "best test" at a given node, first the "best test" is determined for each attribute, and then the best of best among all attributes are selected. To find the best test for a nominal attribute with n distinct values shown among the training examples at the node, the prior art requires computing the impurity, either by equation (1) or equation (2), for all possible binary partitions of the n values, in general. The subset test that produces the least impurity value is deemed the "best". Since there are $(2^{n-1}-1)$ such tests, this computation is repeated that many times to find the test that yields the minimum. For a nominal attribute such as "country of origin" in the census data, there are over 40 values, which means that over $2^{39}-1$, well over 100 billion, different evaluations of the equation are necessary. Since this computational load is clearly impractical, all available decision tree generation software give up searching for the best test and resort to various heuristic searches when n is greater than say 10. A shortcut to this process is known for two-class (K=2) problems (L. Breiman, et al, Classification and Regression Trees, Wadsworth, 1984). This invention generalizes this short cut process to multi-class problems (the number of classes can be arbitrarily larger than 2) and obtains a very near optimal solution with just (n−1) such evaluations.

The first part of the invention is that the number n can be reduced by combining $V_i$ and $V_j$ as one value for the purpose of optimal subset determination whenever $P_{ik}=P_{jk}$ for all k. The new value that stands for both $V_i$ and $V_j$ has $f_{i'k}=f_{ik}+f_{jk}$ for all k. This process can be iterated as long as there are $V_i$ and $V_j$ with the same class probabilities. We shall assume henceforth that all such merges are done before the main steps.

As important step of the invention begins by determining the principal component of the frequency, $m_i$, weighted P matrix (T. W. Anderson, An Introduction to Multivariate Statistical Analysis, 2nd Ed., Wiley, 1984). First, define frequency weighted average probability $$P_{avgk}=N_k/N \quad (3)$$

And normalized probability matrix $$PN=[P_{ik}-P_{avgk}] \quad (4)$$

Further define weighted-normalized probability matrix $$PNW=[(P_{ik}-P_{avgk}) \times M_i] \quad (5)$$

The weighted variance matrix V is computed as $$V=PN^T \times PNW \quad (6)$$

(T denotes matrix transpose operation)

Let the eigen-vector corresponding to the largest eigen-value of V be E, the vector of first principal component scores is the n-component vector PC obtained by $$PC=P \times E \quad (7)$$

The computation of eigen-values and corresponding eigen-vectors for a given matrix is well known. (See, for instance, T. W. Anderson, An Introduction to Multivariate Statistical Analysis, 2nd Ed., Wiley, 1984.)

The next main step is to reorder the attribute values such that $v_1$ through $V_n$ have ascending (or descending) values of the first principal component score, PC.

The last main step computes the impurities for (n−1) subset tests, which is comprised of subsets, $\{1\}$, $$\{1,2\}, \ldots, \{1,2, \ldots, (n-1)\}.$$

The least impurity test among these subset tests is the very near optimal test.

The foregoing description defines the "basic procedure". A variant which we call the "swap variant" includes an additional (n−1) subset tests, obtained by exchanging adjacent elements between subsets included in the basic procedure and their complements. For example, the original procedure includes a test of the subsets $\{1, 2, \ldots, j\}$ vs. is complement $\{j+1, j+2, \ldots, n\}$; the "swap variant" includes in addition the test obtained by exchanging the elements j and j+1, viz. $\{1, 2, \ldots, j-1\} \cup \{j+1\}$ vs. $\{j\} \cup \{j+2, j+3, \ldots, n\}$. In the "swap variant", the subset tests that are considered are the (n−1) subsets considered in the basic procedure, viz. $\{1\}, \{1,2\}, \ldots, \{1,2, \ldots, n-1\}$, and the additional (n−1) subsets {2}, {1,3}, {1,2,4}, {1,2,3,5}, ..., {1,2, ... ,n−2} ∪ {n}.

The "swap variant" sometimes yields a more nearly optimal test than the basic procedure, at a cost of requiring (2n −2) rather than (n−1) subset tests.

Now, we summarize the method of invention. $I(t_c)$ stands for the average Impurity measure (either Gini or entropy kind from equations, (1) or (2) of choice). We start the description from the contingency matrix, F, for the given nominal attribute. Steps marked with a "*" are carried out only in the "swap variant" of the procedure.

Step1) From the contingency Matrix, form the probability matrix, P, and merge identical rows, to form a reduced F and P.

The number of rows in the reduced F is the number of effective attribute values, n, for the remaining steps. The total number of examples is N, and the number of examples in the class k is $N_k$.

Step2) Compute the principal component by equations (3) through (7).

Step3) Reorder the effective attribute values as $V_i, v2 ... ,V_n$ such that their first principal component scores are in ascending (or descending) order.

Step4) Impurity computations:

4.1) Let c=0, $N_A$=0, and $N_{Ak}$=0 for all k.
4.2) c=: c+1
4.3*) $M_{Ak}:=N_{Ak}+f_{c+1,k}$ for all k
$M_{Ak}:=N_k-M_{Ak}$ for all k
$M_A$=SUM of $M_{Ak}$'S
$M_B=N-M_A$
$P_{Ak}:=M_{Ak}/M_A$ for all k
$P_{Bk}:=M_{Bk}/M_B$ for all k
Compute $I(t_c)$; call the result $J_c$
4.4) $N_{Ak}:=N_{Ak}+f_{ck}$ for all k
$N_{Bk}:=N_k-N_{Ak}$ for all k
$N_A:=$SUM of $N_{Ak}$'S
$N_B:=N-N_A$
$P_{Ak}:=N_{Ak}/N_A$ for all k
$P_{Bk}:=N_{Bk}/N_B$ for all k
Compute $I(t_c)$; call the result $I_c$
4.5) Go to 4.2) if c is less than n−1.

Step5) Let c' be the value of c for which the n−1 $I_c$ values computed in Step4 is minimum.

Step6*) Let c" be the value of c for which the n−1 $J_c$ values computed in Step4 is minimum.

Step7) The "best" subset test for the given nominal attribute is:

"Is the value one of $(V_1, \ldots, V_{c'})$?"

Step8*) For the "swap variant", if $I_{c'}$ is less than or equal to $J_{c''}$, the "best" subset test is as determined in Step7. Otherwise, the "best" subset test for the given nominal attribute is:

"Is the value one of $(V_i, \ldots, V_{c'-1})$ or $V_{c'+1}$?"

We now illustrate the advantage of the fast method by an example. We are given a table of 507 fruits picked in the late season. It has attributes such as kind-of-fruit, size, shape, color, etc. The class to be modelled in a binary tree is whether the fruit is in one of the three classes: pick-and-ship (PS), no-pick (NP), and pick-and-ripen (PR). There are k=6 different color values: green, blue, purple, orange, yellow and red. The contingency matrix is shown in FIG. 1, numeral 10, comprising a TABLE 1.

The class probability matrix P is (all fractions are rounded here)

$$P = \begin{vmatrix} 0.833 & 0.125 & 0.042 \\ 0.76 & 0.16 & 0.08 \\ 0.694 & 0.111 & 0.194 \\ 0.727 & 0.045 & 0.227 \\ 0.952 & 0.019 & 0.029 \\ 0.966 & 0.014 & 0.019 \end{vmatrix}$$

The weighted average probability of equation (3) is $P_{avg}$=0.876 0.041 0.083

The normalized probability matrix of equation (4) is $$PN = \begin{vmatrix} -0.042 & 0.084 & -0.041 \\ -0.116 & 0.119 & -0.003 \\ -0.181 & 0.070 & 0.112 \\ -0.148 & 0.004 & 0.144 \\ 0.077 & -0.022 & -0.054 \\ 0.090 & -0.027 & -0.064 \end{vmatrix}$$

The weighted normalized probability matrix of equation (5) is $$PNW = \begin{vmatrix} -1.018 & 2.006 & -0.988 \\ -2.893 & 2.964 & -0.071 \\ -6.527 & 2.509 & 4.018 \\ -16.331 & 0.444 & 15.888 \\ 8.047 & -2.349 & -5.698 \\ 18.722 & -5.574 & -13.15 \end{vmatrix}$$

The weighted variance matrix of equation (6) is $$V = \begin{vmatrix} 6.296 & -1.633 & -4.663 \\ -1.633 & 0.899 & 0.735 \\ -4.663 & 0.735 & 3.928 \end{vmatrix}$$

The eigen values for this matrix are 7.486, 0.867, and 0. The eigen vector corresponding to the largest eigen value of 7.486 is

E=(1−0.235−0.765)

The vector of first principal component scores of equation (7) is, then,

PC=(0.772 0.661 0.520 0.543 0.926 0.948)

The ascending order of these values is $(V_3\ V_4\ V_2\ V_1\ V_5\ V_6)$ which originally represented colors, (P O B G Y R). The =reordered $V_1$ through $V_6$ is, then,

| re-ordered v | color | original v |
|---|---|---|
| $v_1$ | purple(P) | $v_3$ |
| $v_2$ | "orange"(O) | $v_4$ |
| $v_3$ | blue(B) | $v_2$ |
| $v_4$ | green(G) | $v_1$ |
| $v_5$ | yellow(Y) | $v_5$ |
| $v_6$ | red(R) | $v_6$ |

For the purpose of illustration we show the average impurity of both Gini and entropy kind for all $2^5-1=31$ distinct subset tests on the 6 color values in FIG. 2, numeral 12, comprising a TABLE2.

In the table II, the color value partition columns indicate which colors are in the subset (indicated by the "1" values under the color) being tested. For instance, line 3 of the table has the partition values (1 0 0 0 1 0) which corresponds to the test: "Is the color one of purple, yellow?"

As can be seen from the table II, we need only 5 impurity computations by the basic procedure of the invention, or 10 by its "swap variant", whereas the state of the art search requires 31. In this example, the minimum Gini impurity solution is in line 25 and the minimum entropy in line 29, as indicated by "*"s.

When there are only 2 classes, i.e. K=2, it has been known (reference B) that the attribute's values can be ordered in accordance with one of the classes probabilities, and the impurity computation can be done for consecutive values in a subset as is done in the current invention. The ordering by the first principal component scores we disclosed here is the same as this when K=2, and therefore, we obtain the true minimum impurity. For K greater than 2, the method finds mostly the minimum impurity solution and when it does not do so, the obtained impurity is very close to the minimum.

With reference to the Example, FIGS. 1 and 2, and machine realization of the present invention, we note the following. The program of instructions executable by a machine, for example, an IBM RISC 6000, may preferably be embodied using c++ or FORTRAN. Table I parameters illustrate inputs to the claimed process method of the machine, and the Table II line 25, (or 29) comprising a smallest value, illustrates an output of the machine.

What is claimed is:

1. A program storage device readable by machine, tangibly embodying a program of instructions executable by the machine to perform a method for finding a best test for a nominal attribute for generating a binary decision tree to classify a plurality of values of nominal attribute, the machine receiving a plurality of values of said nominal attribute, the method comprising:
   (1) reducing a number of distinct values of said plurality of said values based on whether there are identical class probabilities among the values of the nominal attribute;
   (2) ordering the values of the nominal attribute by one of an ascending value and a descending value of a principal component score computed from a weighted variance matrix; and
   (3) evaluating only subset tests of consecutively larger subsets of values in said order for impurity computations to classify said values of nominal attribute, and establishing a variant in which said impurity computations are compared using subset tests both for the consecutively larger subsets of values and for subsets obtained by exchanging adjacent elements between each subset and its complement.

2. A program storage device according to claim 1, wherein the method further comprises outputting the best test based on said evaluation of subset tests of the consecutively larger subsets of values.

3. A program storage device according to claim 1, wherein said values are provided as a table having rows and column, said rows including training examples, and said columns including said attributes, wherein one of said attributes comprises said nominal attribute.

4. A program storage device according to claim 3, wherein said test partitions the training examples into two groups, said two groups including a group in a YES-branch and a remainder group in a NO-branch of said binary decision tree.

5. A program storage device according to claim 1, wherein a number of classes is greater than 2.

6. A program storage device according to claim 1, wherein said reducing includes forming a contingency matrix for the nominal attribute.

7. A program storage device according to claim 6, wherein said reducing further comprises forming a probability matrix from the contingency matrix and merging identical rows thereof to form a reduced contingency matrix and a reduced probability matrix.

8. A program storage device according to claim 7, wherein the number of rows in the reduced contingency matrix represents a number of effective attribute values.

9. A program storage device according to claim 1, further comprising a step of performing impurity computations.

10. A program storage device according to claim 1, wherein said nominal attribute has a predetermined number n of distinct values.

11. A program storage device according to claim 1, wherein said method guarantees a near-minimum impurity test on the attribute by computing no more than (n−1) impurity function computations.

12. A method for finding a best test for a nominal attribute for generating a binary decision tree to classify a plurality of values of nominal attribute, the method comprising:
   (1) receiving a plurality of values of said nominal attribute;
   (2) reducing a number of distinct values of said plurality of values based on whether there are identical class probabilities among the values of the nominal attribute;
   (3) ordering the values of the nominal attribute by one of an ascending value and a descending value of a principal component score computed from a weighted variance matrix; and
   (4) evaluating only subset tests of consecutively larger subsets of values in said order for impurity computations to classify said values of nominal attribure, and establishing a variant in which said impurity comutations are compared using subset tests both for the consecutively larger subsets of values and for subsets obtained by exchanging adjacent elements between each subset and its complement.

13. The method of claim 12, further comprising inputting said values of said nominal attribute into a machine prior to reducing said number of said distinct values.

14. The method of claim 12, further comprising outputting the best test based on said evaluation of subset tests of the consecutively larger subsets of values.

15. The method according to claim 12, wherein said nominal attribute has a predetermined number n of distinct values, and wherein said method guarantees a near-minimum impurity test on the attribute by computing only (n−1) impurity function computations.

16. A machine to perform a method for finding a best test for a nominal attribute for generating a binary decision tree to classify a plurality of values of nominal attribute, the machine receiving a plurality of values of said nominal attribute and performing the following:
   (1) reducing a number of distinct values of said plurality of said values based on whether there are identical class probabilities among the values of the nominal attribute;
   (2) ordering the values of the nominal attribute by one of an ascending value and a descending value of a principal component score computed from a weighted variance matrix; and
   (3) evaluating only subset tests of consecutively larger subsets of values in said order for impurity computations to classify said values of nominal attribute, and establishing a variant in which said impurity computations are compared using subset tests both for the consecutively larger subsets of values and for subsets obtained by exchanging adjacent elements between each subset and its complement.

17. The machine of claim 18, wherein the machine outputs the best test based on said evaluation of subset tests of the consecutively larger subsets of values.

* * * * *